United States Patent
Glaser et al.

(10) Patent No.: US 8,227,683 B2
(45) Date of Patent: Jul. 24, 2012

(54) SYSTEM, METHOD, AND APARATUS FOR EXTRACTING POWER FROM A PHOTOVOLTAIC SOURCE OF ELECTRICAL ENERGY

(75) Inventors: John Stanley Glaser, Niskayuna, NY (US); Michael Andrew de Rooij, Sparks, NV (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/854,947

(22) Filed: Aug. 12, 2010

(65) Prior Publication Data

US 2011/0036387 A1 Feb. 17, 2011

Related U.S. Application Data

(62) Division of application No. 11/736,125, filed on Apr. 17, 2007, now abandoned.

(51) Int. Cl.
*H01L 31/042* (2006.01)
(52) U.S. Cl. ........................ 136/244; 136/293; 323/906
(58) Field of Classification Search .................. 136/244, 136/293; 323/906
See application file for complete search history.

(56) References Cited

U.S. PATENT DOCUMENTS

| | | | | |
|---|---|---|---|---|
| 4,580,090 A * | 4/1986 | Bailey et al. | ................... | 323/303 |
| 4,725,740 A | 2/1988 | Nakata | | |
| 5,001,415 A * | 3/1991 | Watkinson | ..................... | 323/304 |
| 5,654,883 A * | 8/1997 | Takehara et al. | ................ | 363/79 |
| 6,057,665 A * | 5/2000 | Herniter et al. | ................ | 320/101 |
| 6,169,678 B1 | 1/2001 | Kondo et al. | | |
| 6,639,421 B1 * | 10/2003 | Yoshino et al. | .......... | 324/761.01 |
| 6,858,791 B2 | 2/2005 | Erban | | |
| 7,045,991 B2 | 5/2006 | Nakamura et al. | | |
| 2003/0096642 A1 * | 5/2003 | Bessa et al. | ..................... | 455/573 |
| 2004/0117676 A1 * | 6/2004 | Kobayashi et al. | ........... | 713/300 |
| 2005/0002214 A1 | 1/2005 | Deng et al. | | |

FOREIGN PATENT DOCUMENTS

JP 63136117 A * 6/1988

OTHER PUBLICATIONS

E Koutroulis et al., "Development of a Microcontroller-Based, Photovoltaic Maximum Power Point Tracking Control System," IEEE Transactions on Power Electronics, vol. 16, No. 1, Jan. 2001, pp. 46-54.

R. W. Erickson et al., "Fundamentals of Power Electronics," 2nd edition. ISBN 0-7923-7270-0, pp. 637-663, 2001.

* cited by examiner

*Primary Examiner* — Jessica L Ward
*Assistant Examiner* — Jacky Yuen
(74) *Attorney, Agent, or Firm* — Ann M. Agosti

(57) ABSTRACT

System, method, and apparatus are provided for harvesting electrical energy from a photovoltaic source of electrical energy. The photovoltaic source has power-generating characteristics defined by a family of voltage-current curves comprising points of maximum electrical power over a respective range of at least one of the following for the photovoltaic source: distinct illumination intensities and distinct temperatures. The apparatus is made up of a switching converter coupled to the photovoltaic source. The converter has an input voltage-current curve having a predefined functional relationship between the input voltage and the input current. The predefined functional relationship of the input voltage-current curve of the converter is configured to provide during operation of the converter an approximation with respect to at least some of the points of maximum electrical power for the photovoltaic source without having to perform current and voltage calculations corresponding to a maximum power from the photovoltaic source.

14 Claims, 3 Drawing Sheets

SYSTEM, METHOD, AND APARATUS FOR EXTRACTING POWER FROM A PHOTOVOLTAIC SOURCE OF ELECTRICAL ENERGY

CROSS REFERENCE TO RELATED APPLICATIONS

This application is a divisional of U.S. patent application Ser. No. 11/736,125, entitled "SYSTEM, METHOD, AND APPARATUS FOR EXTRACTING POWER FROM A PHOTOVOLTAIC SOURCE OF ELECTRICAL ENERGY", filed 17 Apr. 2007, now abandoned which is herein incorporated by reference.

FIELD OF THE INVENTION

The present invention is generally related to harvesting electrical power from a source of electrical energy, and, more particularly, to system and method for extracting, under a wide variety of operational and/or environmental conditions, maximum or near-maximum electrical power from a source of electrical energy, such as a photovoltaic (PV) power source, a fuel cell or a battery.

BACKGROUND OF THE INVENTION

For a given level of insulation (illumination intensity), a photovoltaic (PV) energy source may be characterized by a graph of current versus voltage, generally referred to as the current-voltage (I-V) curve. It is known that when the PV source is uniformly illuminated, then such a PV source typically has one unique value of current and voltage at which maximum electrical power can be extracted for a given illumination intensity and/or temperature.

To extract maximum electrical power, an electrical load connected to the PV source must be adjusted such that the I-V curve of the load intersects the I-V curve of the PV source at the maximum power point. This is commonly achieved by coupling to the PV source an active load, such as a switching power converter, controlled to dynamically seek the maximum power point of the PV source by adjusting its respective I-V characteristics as a function of sensed PV source characteristics.

The switching power converter, also referred to as the PV load converter, may be configured to output useful electrical power, which may be processed by additional converters or supplied directly to the working load. The power of the PV source may be monitored by a suitable power monitor means, and a maximum power point tracking algorithm may then be processed in a suitable processor to determine how to dynamically adjust the switching converter operation such that its input I-V curve intersects the I-V curve of the PV source at the maximum power point. A generated control signal resulting from the processing of the algorithm is fed to the converter so that it may be adjusted in such a manner. In this setup it is generally presumed that the working load will use essentially all of the available power of the PV source.

A PV system equipped with maximum power point tracking should, in theory, be able to dynamically track changes due to variations in the environment of the PV source and/or due to aging of the PV source and should extract maximum electrical power during the operation of the PV system. In practice, however, there are some issues concomitant with maximum power tracking techniques. First, the implementation of the tracking algorithm in a processor requires an incremental consumption of electrical power for powering such a processor, thus reducing harvesting efficiency of the PV system. Second, maximum power tracking is generally much more complex than just regulating the switching converter to a reference and the switching operation of the converter can interfere with appropriately determining the maximum power point and, in some cases, is prone to operational instabilities while seeking to solve the maximum power point algorithm. Third, power tracking algorithms commonly require sensing of both current and voltage of the PV source. This current sensing often results in additional losses, thus further reducing the overall efficiency of the PV system.

Thus, it would be desirable to provide a photovoltaic system not subject to the foregoing issues. It would be further desirable to use any of various relatively low cost and reliable PV load converter topologies with I-V curve characteristics suitable for combined integration (e.g., power stacking) of multiple PV sources, thereby leading to efficiencies of scale, such as may be conducive to constructing a large PV array with any desired number of basic photovoltaic modules.

BRIEF DESCRIPTION OF THE INVENTION

Generally, the present invention fulfills the foregoing needs by providing, in one aspect thereof, a photovoltaic system that includes a photovoltaic source of electrical energy. The photovoltaic source has power-generating characteristics defined by a family of voltage-current curves comprising points of maximum electrical power over a respective range of at least one of the following for the photovoltaic source: distinct illumination intensities and distinct temperatures. A switching converter is coupled to the photovoltaic source, wherein the converter comprises an input voltage-current curve having a predefined functional relationship between the input voltage and the input current. The predefined functional relationship of the input voltage-current curve of the converter is configured to provide during operation of the converter an approximation with respect to at least some of the points of maximum electrical power for the photovoltaic source without having to perform current and voltage calculations corresponding to a maximum power from the photovoltaic source.

In another aspect thereof, the present invention further fulfills the foregoing needs by providing a method for harvesting electrical power from a photovoltaic system. The method defines power-generating characteristics of a photovoltaic source of electrical energy by a family of voltage-current curves comprising points of maximum electrical power over a respective range of at least one of the following for the photovoltaic source: distinct illumination intensities and distinct temperatures. The method allows coupling a switching converter to the photovoltaic source, wherein the converter comprises an input voltage-current curve having a predefined functional relationship between the input voltage and the input current. The converter is operated to approximate at least some of the points of maximum electrical power for the photovoltaic source based on a configuration of the predefined functional relationship of the input voltage-current curve of the converter without having to perform current and voltage calculations corresponding to a maximum power from the photovoltaic source.

In yet another aspect thereof, the present invention further fulfills the foregoing needs by providing apparatus for harvesting electrical energy from a photovoltaic source of electrical energy. The photovoltaic source has power-generating characteristics defined by a family of voltage-current curves comprising points of maximum electrical power over a respective range of at least one of the following for the photovoltaic source: distinct illumination intensities and distinct temperatures. The apparatus comprises a switching converter coupled to the photovoltaic source, wherein the converter comprises an input voltage-current curve having a predefined functional relationship between the input voltage and the input current. The predefined functional relationship of the input voltage-current curve of the converter is configured to provide during operation of the converter an approximation with respect to at least some of the points of maximum electrical power for the photovoltaic source without having to perform current and voltage calculations corresponding to a maximum power from the photovoltaic source.

BRIEF DESCRIPTION OF THE DRAWINGS

The features and advantages of the present invention will become apparent from the following detailed description of the invention when read with the accompanying drawings in which:

FIG. 2 further shows a graph of an example of a maximum power-generation curve of the PV source that intersects the various I-V curves. Also FIG. 2 shows two example embodiments of input I-V curves for a power converter embodying aspects of the present invention;

DETAILED DESCRIPTION OF THE INVENTION

The inventors of the present invention propose an innovative photovoltaic (PV) system and/or methodology that may be advantageously used to extract, under a wide variety of operational and/or environmental conditions, maximum or near-maximum electrical power from a source of electrical energy, such as photovoltaic (PV) power source, as may be made up of a single photovoltaic cell or a photovoltaic module in the case of a battery of cells. Advantageous aspects of the present invention eliminate the need of having to utilize maximum power tracking circuitry and control for such circuitry, and thus avoid issues concomitant with maximum power tracking circuitry or control. For example, aspects of the present invention avoid having to utilize processing means for implementing a maximum power tracking algorithm and lead to incremental savings of electrical power since one does not have to electrically power such processing means. Moreover, aspects of the present invention lead to incremental cost reductions in the PV system since the cost that otherwise would be required to provide such processing means is eliminated.

Figure 1:
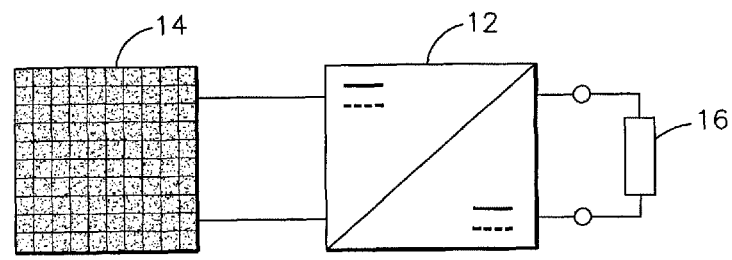
FIG. 1 is a block diagram representation of an example embodiment of a photovoltaic system embodying aspects of the present invention.

As shown in FIG. 1, a photovoltaic system embodying aspects of the present invention may comprise a switching converter 12, such as DC-to-DC converter, as may be electrically coupled between a PV source 14 and an electrical load 16, wherein the input I-V curve of the switching converter is configured so that under a variety of operational and/or environmental conditions, maximum or near-maximum power is extracted from the PV source, without having to perform maximum power point tracking. In one example embodiment, the converter may comprise an input voltage-current curve having a predefined functional relationship between the input voltage and the input current. Examples of such a predefined functional relationship between the input voltage and the input current may be a linear relationship or a cubic relationship, as discussed in greater detail below.

The predefined functional relationship of the input voltage-current curve of the converter may be configured to provide during operation of the converter an approximation with respect to at least some of the points of maximum electrical power for the photovoltaic source without having to perform current and voltage calculations corresponding to a maximum power from the photovoltaic source. It will be appreciated by those skilled in the art that the approximation with respect to at least some of the points of maximum electrical power for the photovoltaic source may be achieved by way of various methodologies, such as a least square fit over a given power range, or one may choose the input voltage-current curve of the converter to intersect both a lower power point and an upper power point while a least square fit may be performed for any intermediate power points between the lower power point and the upper power point. It will be understood that the use of a least square fit technique is just one example of a technique that may be used for determining (e.g., quantifying) the approximation provided by the predefined functional relationship of the input voltage-current curve of the converter with respect to at least some of the points of maximum electrical power for the photovoltaic source and is not part of the converter control algorithm. Another example of a realizable approximation strategy may be implemented in a case where one has accumulated sufficient data to statistically determine a likely average power point of operation of the PV source. In this case the input voltage-current curve of the converter may be configured to approximate such likely average power point of operation. It will be appreciated that such average may vary as a function of factors, such as season (e.g., time of year), geographical location, temperature, etc.

Figure 2:
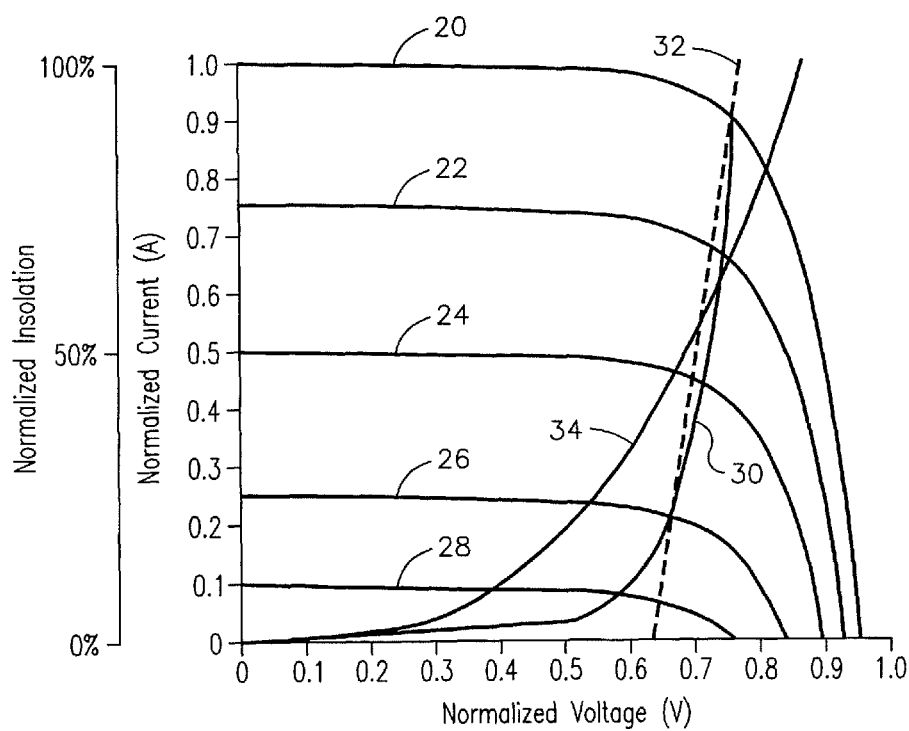
FIG. 2 shows example I-V curves of a PV source at various illumination levels.

FIG. 2 shows an example of a family of input I-V curves of a PV source at various illuminations levels (such as I-V curves 20, 22 24, 26, and 28). FIG. 2 further shows a graph of an example of the maximum power curve of the PV source (curve 30) that intersects the various I-V curves. Also FIG. 2 shows two example embodiments of possible input I-V curves for the power switching converter. A first example input I-V curve for the power switching converter may comprise a linear fit approximation 32, as may be based on a resistive function with a voltage offset along the voltage axis selected to bring this curve proximate to the maximum power point curve 30. A second example input I-V curve for the power switching converter may comprise a cubic fit approximation 34.

As will be appreciated by those skilled in the art, there are multiple techniques to achieve an appropriate I-V input curve in the switching converter. For example, one may use sensing and feedback control techniques to cause the converter to exhibit the desired input I-V curve characteristics. In accordance with aspects of the present invention, it is proposed to utilize any of various commercially available converter topologies that naturally exhibit a desired input I-V curve with minimal or no additional control. One straightforward example is to use any of a class of switching converters with a linear I-V curve. For example, linear resistor emulators, such as those comprising high power factor rectifiers, can generate a linear I-V curve, as defined by the following relationship: I=K1*V, where K1 is a constant that may be adjusted based on the requirements of a given application.

One basic consideration in practical PV systems is that the amount of current and/or voltage supplied by the PV source is likely to change substantially due to the wide changes that can occur in illumination intensity and/or temperature. That is, a practical PV system may be substantially dependent on the illumination intensity, ambient temperature, location of installation, and combination of the foregoing. It has been observed that a linear fit through the origin of the I-V plane, while uncomplicated to realize and useful in many applications, may not necessarily provide the optimum input I-V curve for maximizing the power extraction from the PV source for cases subject to a wide range of operating conditions. In such cases, improved performance can be obtained when the load converter input I-V curve has a relatively high slope (i.e., relatively high conductance) near the vicinity of the maximum power point of the I-V curve of the PV source. One example means to achieve this goal is to use a converter with a relatively sharp slope (e.g., providing a linear fit approximation) for its input I-V curve, which is also appropriately offset along the voltage axis so that the linear fit approximation intersects the PV source I-V curve near the maximum power point, as shown in FIG. 2 (input I-V curve 32). Another example means to accomplish the same goal is to use a converter with a curve of increasing slope, (e.g., a cubic fit approximation) also shown in FIG. 2 (input I-V curve 34). The description below will provide some example embodiments of switching converter topologies that may be used to realize such example input I-V curves in the power switching converter.

Figure 3:
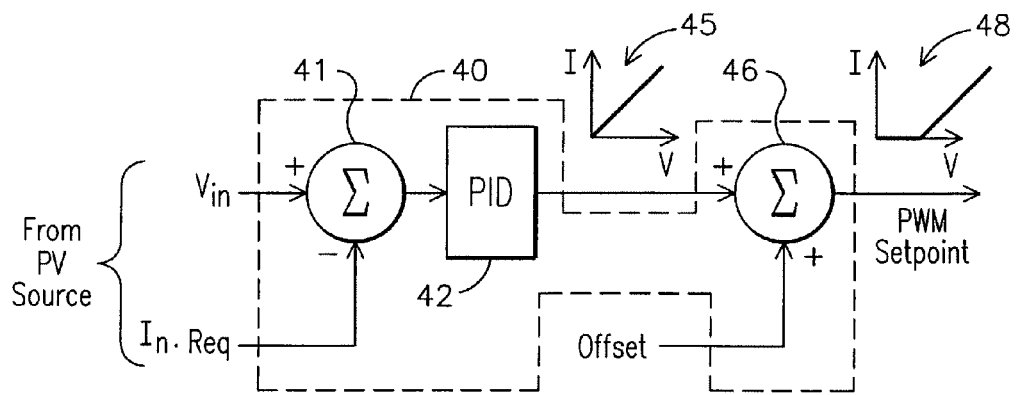
FIG. 3 is a block diagram representation of an example embodiment of a converter configured to provide an input I-V curve having a linear fit approximation with a voltage offset.

FIG. 3 is a block diagram of an example implementation of a converter circuitry 40 configured to provide an input I-V curve having a linear fit with a voltage offset (such as input I-V curve 32 in FIG. 2). For example, a proportional-integral-derivative (PID) controller 42 may be configured to process an output signal from summer 41 that combines a voltage signal (Vin) and a current signal (Iin), (as may be scaled by a suitable scaling factor (Req)) to output an error signal exhibiting a linear fit. See, for example, inset 45. A summer 46 combines the output signal from PID controller 42 and an offset voltage to generate a signal that (may be used as the pulse-width modulation (PWM) setpoint for the converter) exhibits the linear fit plus the voltage offset. See, for example, inset 48. By way of example, the circuitry illustrated in FIG. 3 can be implemented using the functional blocks available in a standard off-the-shelf PWM regulator (such as regulator part No. UC3854, commercially available from Texas Instruments) that can be implemented in a variety of single switch converter topologies, such as buck/boost, buck or boost converters. Temperature compensation can be optionally implemented by adjusting the offset reference as a function of a sensed parameter indicative of temperature of the PV source, for example.

Figure 4:
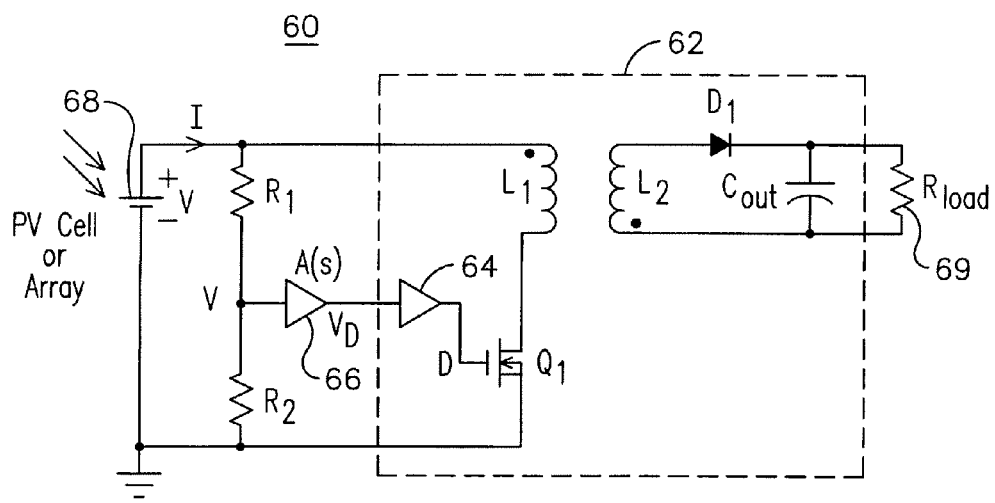
FIG. 4 is a block diagram representation of an example embodiment of a PV system with a converter configured to provide an input I-V curve having a cubic fit approximation.

FIG. 4 is a block diagram of one example implementation of a PV system 60 with a converter 62 configured as a flyback converter to provide an input I-V curve having a cubic fit approximation, (such as input I-V curve 34 in FIG. 2). Converter 62 includes a pulse-width modulator (PWM) 64 that generates a pulse waveform of a predefined frequency and has a pulse duty cycle D proportional to a voltage $V_D$ supplied by a gain amplifier 66. The output of PWM 64 is coupled to a gating terminal of a semiconductor power switch Qi, such as a MOSFET switch. FIG. 4 further shows a pair of coupled inductors $L_1$ and $L_2$, a diode $D_1$ and a filter capacitor $C_{out}$ coupled to a given electrical load 69. The flyback converter may be designed to operate in discontinuous conduction mode (DCM), and such operation would be well known to one skilled in the art. It can be shown that the DCM flyback converter input I-V curve is given by $I=V*D^2/K_2$, where D is the converter duty cycle, i.e. the control input, and $K_2$ is a constant. Thus, the current is proportional to the input voltage V, which generates a linear I-V curve. If one senses voltage V from a PV source 68 to output a sensed voltage $V_{sense}$, using for example a resistive divider network (e.g., resistors $R_1$ and $R_2$), and the voltage $V_{sense}$ is fed to gain amplifier 66, then the duty cycle D becomes proportional to V. That is, $D=K_3*V$, where $K_3$ is a constant, and thus the relationship for current I as a function of voltage V becomes $I=V^3*K_3^2/K_2$. That is, the current I is proportional to $V^3$, as desired.

To further improve operational performance, aspects of the present invention contemplate that the input I-V curve of the converter may be adjusted as a function of PV source temperature so that the input I-V curve, for example, shifts along the voltage axis as a function of PV source temperature. The sensing of a parameter indicative of temperature of the PV source may be accomplished with a thermistor or other temperature sensor on an integrated circuit, such as may be part of the converter circuitry. Since in some applications, the PV source and converter circuitry may be integrated and thermally coupled to one another in a common package, this temperature sensing may be readily accomplished in multiple ways. For example, it is contemplated that in some applications, the temperature sensor may be a redundant, optionally shaded PV cell mounted with the other cells of the PV source. For example, a section of the photovoltaic source may be masked to avoid a response due to illumination, and an electrical signal from the masked section may be used for sensing temperature of the photovoltaic source. As will be appreciated by those skilled in the art, various combinations of physical proximity and conductive path characteristics may be used for achieving a desired thermal coupling for a given application. Moreover, the thermal coupling may be configured so that in one example embodiment the PV source and converter circuitry may be at substantially the same temperature or optionally at a predictable temperature offset with respect to one another.

Figure 5:
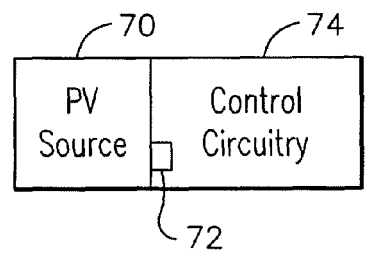
FIG. 5 is a block diagram representation of an example embodiment of a PV system embodying aspects of the present invention wherein the input I-V curve of the converter may be adjusted as a function of PV source temperature.

Aspects of the present invention recognize that various techniques may be used for obtaining a temperature indication of a PV source 70, such as illustrated in FIG. 5. For example, a temperature sensor 72 may be an integral part of a respective integrated circuit in a converter circuitry 74. For example, the temperature sensor may sense temperature variation of the integrated circuit (and thus of a PV source thermally coupled to the integrated circuit) by utilizing a thermally-sensitive voltage reference therein, such as a bandgap reference of a semiconductor device.

In another example, the temperature sensor may utilize an external voltage reference coupled to drive a thermally-sensitive electrical component in the integrated circuit, such as a resistor, diode, capacitor, or a transistor. In yet another example, the temperature sensor may sense temperature in the respective integrated circuit by monitoring, for example, a diode current leakage. That is, some of the circuitry that is part of the integrated circuit (typically used for conditioning or processing the signals from the PV source) may be used for obtaining a temperature indication of the PV source. Also the temperature sensor may be assembled onto suitable pads built in the integrated circuit, such as a surface-mounted miniature thermistor mounted on diode pads. It will be appreciated that the temperature sensor need not be integral to a respective integrated circuit, since, for example, the temperature sensor may be disposed external to the integrated circuit, such as mounted on an outer surface thermally coupled to the integrated circuit. In one example embodiment, this thermally-sensitive electrical component (e.g., functioning as a temperature sensor) can be directly mounted to the rear side of the PV cell or PV module. For example, the photovoltaic source may include a first face exposed to illumination and a second face opposite the first face not exposed to illumination. It is contemplated that in this example embodiment the converter may be integrated with the photovoltaic source at the second face of the PV cell or PV module. That is, the non-illuminated face of the PV cell or PV module.

In some applications, an array of PV modules may be needed because a single PV module may not be capable of supplying enough power, as may be required in a given power application. Achieving power scaling in practical PV arrays has presented some difficulties. For instance, in known PV arrays, it may not be possible to continue to increment the number of PV modules that may be connected to achieve a desired power rating. This is due to the possibility that incompatibilities may develop between the respective input and output I-V characteristics of the converters to be connected. Moreover, in PV systems equipped with a maximum power point tracking algorithm, such algorithms may be unable to determine the maximum power point of a plurality of PV modules, such as may occur when a subset of individual PV modules in a PV modular array become shaded. This partial shading modifies the shape of the composite I-V curve of the PV array in a manner that substantially increases the complexity of maximum power tracking such that there may be a need for determining both local and global maximum power point tracking algorithms. Thus, known PV arrays may be limited in the number of PV modules that can be interconnected to one another, and consequently may lack the ability to provide the desired power scalability.

Figure 6:
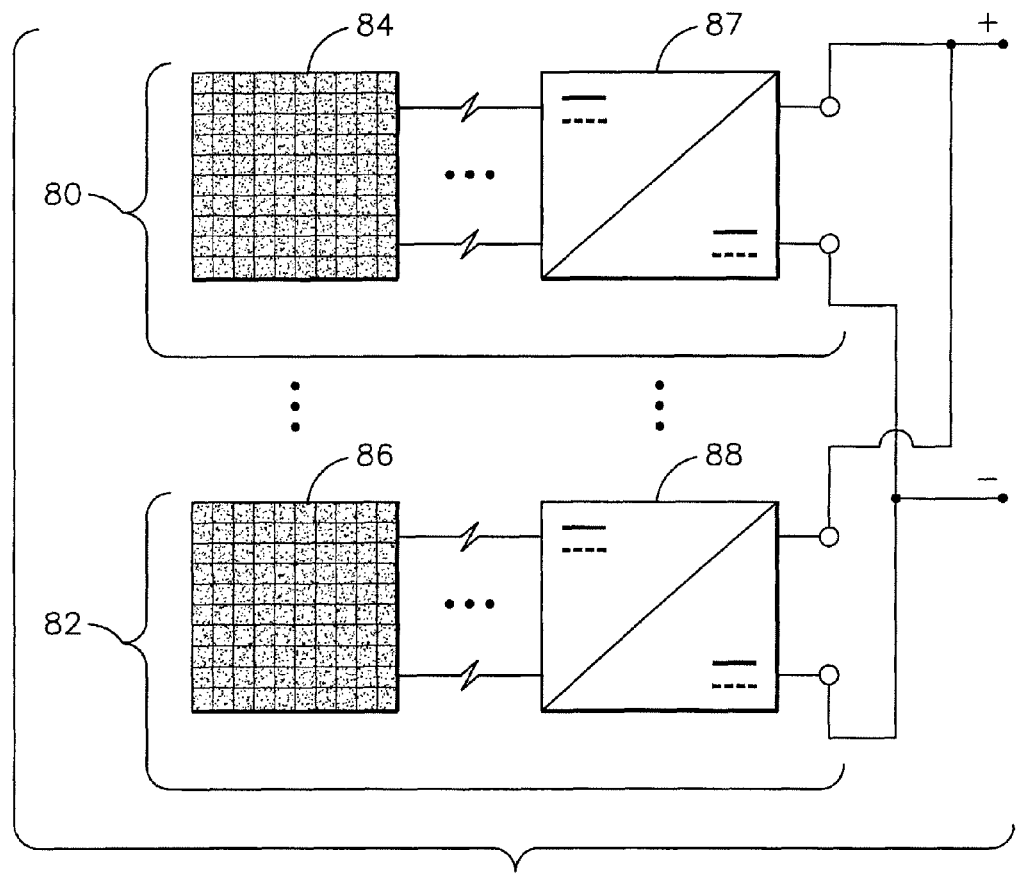
FIG. 6 is a block diagram representation of an example embodiment of a PV system made up of a PV modular array embodying aspects of the present invention, wherein each module converter therein may be interconnected to other such converters to provide a desired power scalability.

It is noted that yet another advantage provided by converters with the input I-V curves embodying aspects of the present invention is that the respective output I-V curves of such converters exhibit characteristic suitable for sharing electrical power when connected together to one another, as shown in FIG. 6. This is conducive to combining the power output from multiple PV modules, such as modules 80 and 82 including respective PV sources 84 and 86 and respective switching converters 87 and 88. This benefit may be achieved when the PV load converter's input I-V curve is independent of the PV load converter's output, as is the case in connection with the example input I-V curves discussed above. Thus, each PV load converter will act as a power source, providing advantageous power scaling capabilities. Each converter becomes a power source and can be connected in any desired manner, such as in a series circuit, in a parallel circuit, or series/parallel circuit combinations, to other such converters that may be part of a PV modular array, provided the working load uses essentially all the power delivered by the PV sources.

Although specific example embodiments have been described above for some example input I-V curve characteristics, below are provided some generic helpful conditions regarding the input I-V curve characteristics of the converter:

1. Slope of the input I-V curve is positive at the intersection of the PV source's I-V curve and the PV load converter's input I-V curve.

2. A line drawn tangent to the PV load converter's input curve at the intersection with the PV source curve should intersect the current-axis below Isc (short circuit current) or the voltage-axis below Voc (open circuit Voltage).

3. Intersection of the PV source's I-V curve and the PV load converter's input I-V curve should be at or near the maximum power point under typical operating conditions. Operation should be at theoretical maximum for at least one point under the set of all operating conditions.

While preferred embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A photovoltaic system, comprising:
a photovoltaic source of electrical energy, the photovoltaic source comprising power-generating characteristics defined by a family of source voltage-current curves comprising points of maximum electrical power over a respective range of at least one of the following for the photovoltaic source: distinct illumination intensities and distinct temperatures;
a resistive divider network for sensing voltage from the photovoltaic source;
a gain amplifier for receiving the sensed voltage from the resistive divider network and amplifying the sensed voltage from the resistive divider network;
a switching converter coupled to the photovoltaic source and comprising an input voltage-current curve having a predefined functional relationship between an input voltage and an input current configured to provide a cubic fit approximation with respect to at least some of the points of maximum electrical power for the photovoltaic source, the switching converter further comprising at least one switch and a pulse width modulator for receiving the amplified sensed voltage from the gain amplifier to establish a directly proportional relationship between a duty cycle of the switching converter and the voltage from the photovoltaic source and for supplying gating signals to the at least one switch for operating the switching converter in a discontinuous conduction mode to establish a relationship between the input current of the switching converter, the input voltage of the switching converter, and a square of the duty cycle of the switching converter that is the cubic fit approximation of at least some of the points of maximum electrical power on the source voltage-current curves without having to perform current and voltage calculations corresponding to a maximum power from the photovoltaic source.

2. The photovoltaic system of claim 1, where the switching converter comprises a type of converter selected from the group consisting of a flyback, and a buck-boost type of converter.

3. The photovoltaic system of claim 1, wherein a section of the photovoltaic source is masked to avoid a response due to illumination, and wherein an electrical signal from the masked section is used for sensing temperature of the photovoltaic source.

4. The photovoltaic system of claim 1, comprising a plurality of switching converters each coupled to receive electrical power from a respective photovoltaic source comprising power-generating characteristics defined by a family of voltage-current curves comprising points of maximum electrical power over a respective range of at least one of the following for the photovoltaic source: distinct illumination intensities and distinct temperatures, wherein each individual converter comprises an input voltage-current curve having a predefined functional relationship between an input voltage and an input current configured to provide a cubic fit approximation with respect to at least some of the points of maximum electrical power for the respective photovoltaic source, and further wherein each individual converter output is connected to one another to form a circuit combination so that a desired scaling of output power is reached.

5. The photovoltaic system of claim 4, wherein the circuit combination is selected from a group consisting of a series circuit, a parallel circuit and a combination of the foregoing circuits.

6. The photovoltaic system of claim 4, wherein each individual converter comprises a DC-to-DC converter.

7. The photovoltaic system of claim 1, wherein the photovoltaic source comprises a first face exposed to illumination and a second face opposite the first face not exposed to illumination and wherein the converter is integrated with the photovoltaic source at the second face thereof.

8. Apparatus for harvesting electrical energy from a photovoltaic source of electrical energy, the photovoltaic source comprising power-generating characteristics defined by a family of source voltage-current curves comprising points of maximum electrical power over a respective range of at least one of the following for the photovoltaic source: distinct illumination intensities and distinct temperatures, the apparatus comprising;
- a resistive divider network for sensing voltage from the photovoltaic source;
- a gain amplifier for receiving the sensed voltage from the resistive divider network and amplifying the sensed voltage from the resistive divider network;
- a switching converter coupled to the photovoltaic source and comprising an input voltage-current curve having a predefined functional relationship between an input voltage and an input current configured to provide a cubic fit approximation with respect to at least some of the points of maximum electrical power for the photovoltaic source, the switching converter further comprising at least one switch and a pulse width modulator for receiving the amplified sensed voltage from the gain amplifier to establish a directly proportional relationship between a duty cycle of the switching converter and the voltage from the photovoltaic source, and for supplying gating signals to the at least one switch for operating the switching converter in a discontinuous conduction mode to establish a relationship between the input current of the switching converter, the input voltage of the switching converter, and a square of the duty cycle of the switching converter, that is the cubic fit approximation of at least some of the points of maximum electrical power on the source voltage-current curves without having to perform current and voltage calculations corresponding to a maximum power from the photovoltaic source.

9. The apparatus of claim 8, where the switching converter comprises a type of converter selected from the group consisting of a flyback and a buck-boost type of converter.

10. The apparatus of claim 8, comprising a plurality of switching converters each coupled to receive electrical power from a respective photovoltaic source comprising power-generating characteristics defined by a family of voltage-current curves comprising points of maximum electrical power over a respective range of at least one of the following for the photovoltaic source: distinct illumination intensities and distinct temperatures, wherein each individual converter comprises an input voltage-current curve having a predefined functional relationship between an input voltage and an input current configured to provide a cubic fit approximation with respect to at least some of the points of maximum electrical power for the respective photovoltaic source, and further wherein each individual converter output is connected to one another to form a circuit combination so that a desired scaling of output power is reached.

11. The apparatus of claim 10, wherein the circuit combination is selected from a group consisting of a series circuit, a parallel circuit and a combination of the foregoing circuits.

12. The apparatus of claim 10, wherein each individual converter comprises a DC-to-DC converter.

13. The photovoltaic system of claim 1, wherein at least one electrical component of the photovoltaic system comprises a thermally-sensitive component.

14. The apparatus of claim 8, wherein at least one electrical component of the apparatus comprises a thermally-sensitive component.

* * * * *